United States Patent
Katae

(10) Patent No.: US 7,458,725 B2
(45) Date of Patent: Dec. 2, 2008

(54) METHOD AND DEVICE FOR SEALING A BEARING

(75) Inventor: Kenichi Katae, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 401 days.

(21) Appl. No.: 11/297,026

(22) Filed: Dec. 7, 2005

(65) Prior Publication Data

US 2006/0120648 A1 Jun. 8, 2006

(30) Foreign Application Priority Data

Dec. 8, 2004 (JP) .......................... P2004-354780

(51) Int. Cl.
*F16C 33/74* (2006.01)
(52) U.S. Cl. ..................... 384/130; 384/147
(58) Field of Classification Search ............... 384/130, 384/139–153; 280/93.508
See application file for complete search history.

(56) References Cited

U.S. PATENT DOCUMENTS

| | | | | |
|---|---|---|---|---|
| 2,294,105 | A * | 8/1942 | Wallgren | 384/140 |
| 2,593,410 | A * | 4/1952 | Buckendale | 384/140 |
| 4,175,756 | A | 11/1979 | Denton et al. | 277/189 |
| 4,457,521 | A * | 7/1984 | Morley | 305/103 |
| 4,498,679 | A | 2/1985 | Balczun | 277/92 |
| 5,947,496 | A * | 9/1999 | Kraft et al. | 280/93.508 |
| 5,975,547 | A | 11/1999 | Stroh et al. | |
| 6,102,408 | A * | 8/2000 | Anderton et al. | 277/370 |
| 6,210,041 | B1 * | 4/2001 | West | 384/147 |
| 6,783,129 | B2 * | 8/2004 | Akita et al. | 277/349 |
| 2006/0022412 | A1 * | 2/2006 | Brock et al. | 277/358 |

FOREIGN PATENT DOCUMENTS

| | | |
|---|---|---|
| CN | 1289296 | 3/2001 |
| EP | 1 067 040 | 1/2001 |
| JP | 57-203123 | 12/1982 |
| JP | 10-338156 | 12/1998 |
| JP | 2000-227162 | 8/2000 |

OTHER PUBLICATIONS

Korean Office Action dated Nov. 13, 2006 for Korean Patent Application No. 2005-0119449.
Chinese Office Action dated Jul. 20, 2007, received in corresponding Chinese Patent Application No. 2005101363959 with English translation.

* cited by examiner

*Primary Examiner*—Thomas R Hannon
(74) *Attorney, Agent, or Firm*—Morgan & Finnegan, LLP

(57) ABSTRACT

The present invention provides a bearing sealing method for sealing a bearing member which is interposed between a first member and a second member and allows relative rotation between the first member and the second member. The method includes the steps of keeping the bearing member under a sealed state by interposing a seal between the first member and second member; and releasing the bearing member from the sealed state by bending a first seal element of the seal outward only upon pressure increase in the sealed bearing member. The first seal element is normally in contact with one of the first member and the second member.

7 Claims, 10 Drawing Sheets

METHOD AND DEVICE FOR SEALING A BEARING

BACKGROUND

The present invention relates to a method and a device for sealing, a bearing in which lubricant is used.

As to the method for sealing a bearing in which lubricant is used, a first example of prior art is shown in FIGS. 9 and 10. In this prior art regarding the connection of a rear-axle tie rod and a cylinder arm in a steering unit for a forklift truck, the cylinder arm 71 is held by upper and lower tie rods 72, 73 with a washer 75 of a disc spring interposed between the cylinder arm 71 and each of the tie rods 72, 73, and a tie-rod pin 74 is inserted through the cylinder arm 71, the tie rods 72, 73, and the washers 75 to fasten them. A collar 77 that serves as a bearing member is fitted between the sliding surfaces of the cylinder arm 71 and the tie-rod pin 74, thereby supporting the cylinder arm 71 pivotally around the tie-rod pin 74. The tie-rod pin 74 is provided at the top thereof with a nipple 78 through which lubricating grease is supplied. The surface of the tie-rod pin 74 which slides over the collar 77 is formed with a supply port 74a which is opened to a circumferential groove 74b of the tie-rod pin 74. The supply port 74a is connected to the nipple 78 through a communication passage 74c which is formed axially in the tie-rod pin 74. Grease supplied from the nipple 78 to the sliding surfaces of the collar 77 and the tie-rod pin 74 smoothens the pivotal movement of the cylinder arm 71.

A second example of prior art which is disclosed by Japanese Unexamined Patent Publication No. 10-338156 shows a structure for sealing a gear housing in a steering unit. In this prior art structure, washers are interposed between a dust boot and the inner ends of a pair of right and left tie rods, respectively. A lip made of an elastic material is baked to the inner peripheral edge of each washer in close contact with the outer peripheral surfaces, of bolts thereby to prevent the ingress of water. Therefore, when each washer is interposed between the dust boot and the inner ends of the tie rods to be firmly sandwiched therebetween, the lip is pressed in tight contact. With the flat surface of a bushing inserted in bolt holes of the inner ends of the tie rods and the outer peripheral surfaces of the bolts thereby to prevent the ingress of water from without.

In the above-mentioned first example of prior art, however, the rear-axle tie rod is firmly connected with the cylinder arm by only the washer 75 which is made of a disc spring and disposed between the cylinder arm 71 and the tie rod 72 (73) In this case, although the ingress of foreign matter is prevented, there is fear that liquid such as water may enter into sealing area through the paths C, D as shown in FIG. 10. When water enters into the sealing area, grease in a sliding portion is forced out of the sealing area, resulting in poor lubrication hence development of rust.

Although the lip seal washer which is disclosed by the above-mentioned second example of prior art solves the problem of the first example of prior art by preventing the ingress of water by having the lip which improves the sealing of the gear housing, it Is difficult to discharge or remove old lubricant out of the sealing area. Consequently, the lubricant supply from the nipple 78 of the first example of prior art cannot be performed.

SUMMARY

The present invention is directed to method and device for sealing a lubricated bearing, which prevent moisture and foreign matter from entering into the bearing and also permit replenishment or replacement of lubricant.

The present invention provides the bearing sealing method for sealing a bearing member which is interposed between a first member and a second member and allows relative rotation between the first member and the second member. The method includes the steps of: keeping the bearing member under a sealed state by interposing a seal between the first member and second member; and releasing the bearing member from the sealed state by bending a first seal element of the seal outward only upon pressure increase in the sealed bearing member. The first seal element is normally in contact with one of the first member and the second member.

The present invention also provides the bearing sealing device for sealing a bearing member which is interposed between a first member and a second member and allows relative rotation between the first member and the second member. The bearing sealing device includes a seal washer having a washer and a seal. The washer is located adjacent to the first member and the second member. The seal is combined with the washer and interposed between the first member and the second member for sealing the bearing member. The seal has a first seal element which is normally in contact with one of member surfaces of the first member and the second member and bendable outward only by increased pressure in the sealed bearing member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments, together with the accompanying drawing, in which:

DETAILED DESCRIPTION OF THE PREFERRED EMBODIMENTS

The following will describe a bearing sealing device according to a first preferred embodiment of the present invention with reference to FIGS. 1 through 5.

Figure 1:
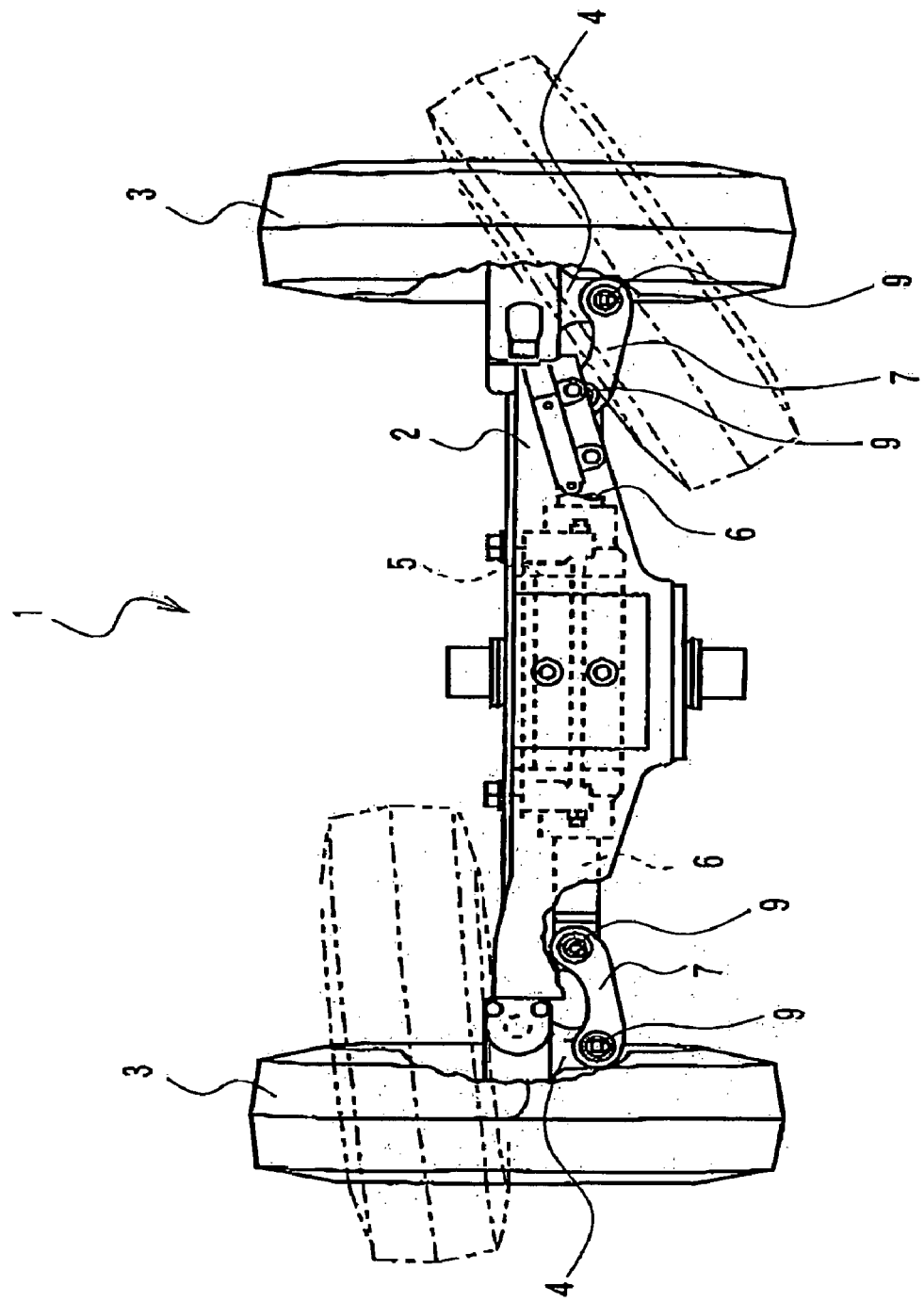
FIG. 1 is a plan view showing a steering unit for a rear axle according to a first preferred embodiment of the present invention.

FIG 1 shows a steering unit 1 for a forklift truck. The steering unit 1 includes a rear axle beam 2 which is swingably journaled at the rear of the forklift truck. Opposite ends of the rear axle beam 2 are provided with right and left wheels 3 respectively by knuckle arms 4 for rotation on their own axes and pivoting for steering operation.

A hydraulic cylinder 5 is mounted in the middle of the rear axle beam 2, extending along the longitudinal direction of the rear axle beam 2 and right and left cylinder arms 6 each of which serves as a first member of the present invention, extend from the opposite ends of the hydraulic cylinder 51 respectively. The hydraulic cylinder 5 is operable in conjunction with a steering valve (not shown) whose operation is controlled by turning operation of a steering wheel (not shown) provided in driver's cabin, and the right and left cylinder arms 6 are moved reciprocally in the direction of vehicle width by oil under pressure fed into one chamber of the hydraulic cylinder 5 while oil in the others chamber is discharged in response to the operation of the steering valve.

The right and left knuckle arms 4, each of which corresponds to the first member of the present invention, are rotatably supported by the respective king pins (not shown) which are in turn supported by the opposite ends of the rear axle beam 2 for pivotal movement about the king pins. The distal ends of the right and left cylinder arms 6, each of which also corresponds to the first member of the present invention, are connected to the knuckle arms 4 through upper and lower tie-rods 7, 8, respectively. The connection between each cylinder arm 6 and the tie rods 7, 8 and the connection between each knuckle arm 4 and the tie rods 7, 8 are pivoted by tie-rod pins 9, each of which corresponds to a second member of the present invention.

The tie rods 7, 8 function to convert the reciprocating movement of the cylinder arm 6 into an arcuate motion of the knuckle arm 4. According to the operation of the steering wheel the hydraulic cylinder 5 is operated to move the cylinder arms 6 in either direction depending on the direction in which the steering wheel is turned By such movement of the cylinder arms 6, the knuckle arms 4 and the wheels 3 are pivoted or turned via the tie rods 7, 8 in the direction depending on the direction in which the cylinder arms 6 are moved. Specifically, when the cylinder arms 6 are moved toward the right wheel as seen in FIG. 1, the wheels 3 are turned in clockwise direction as seen in FIG. 1 thereby to steer the forklift truck rightward, and vice versa. In FIG. 1, chain double-dashed lines show a state where the wheel 3 are steered leftward.

Figure 2:
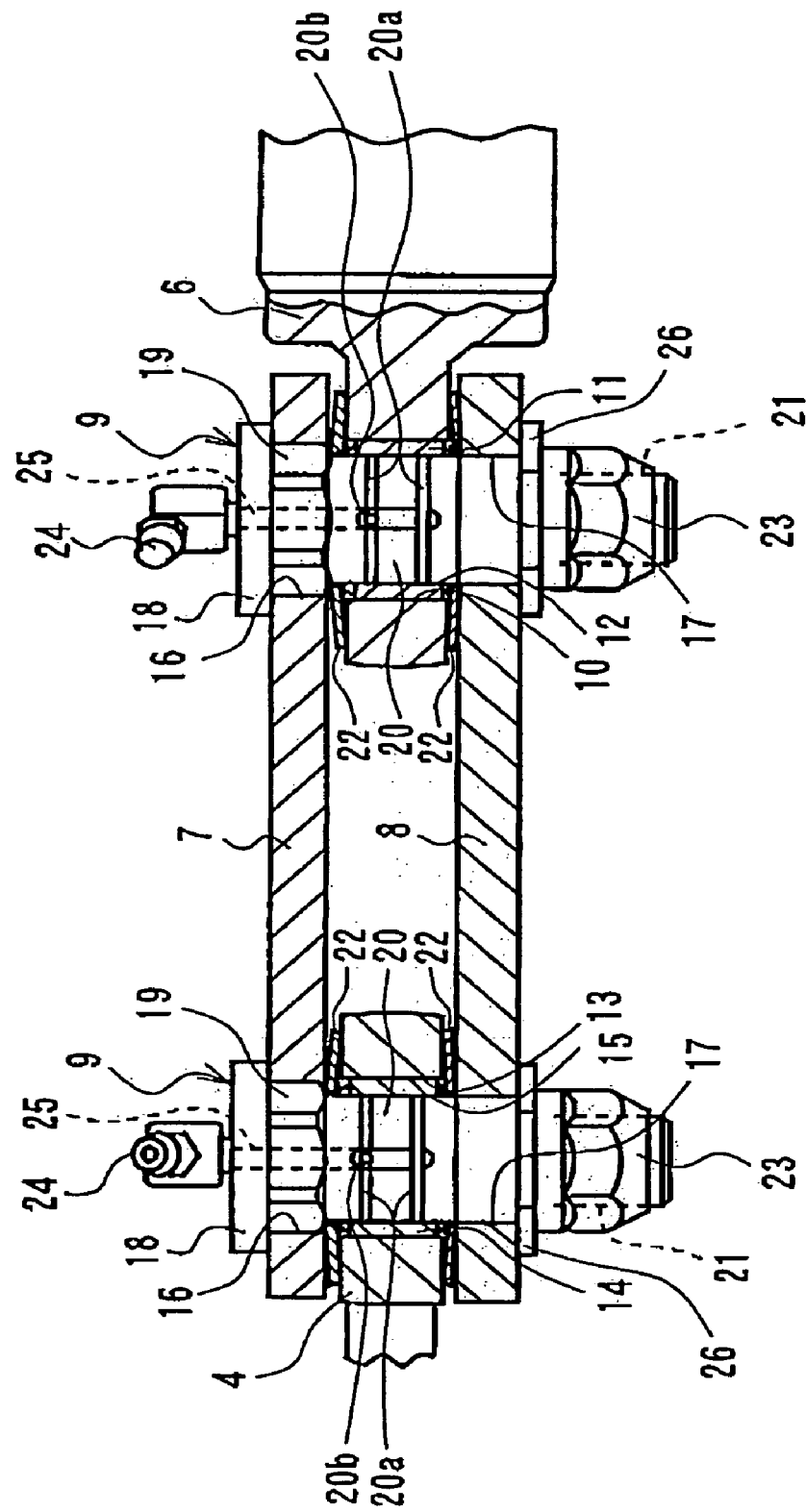
FIG. 2 is a partially enlarged cross sectional view showing connections between, tie rods, cylinder arms and knuckle arms according to the first preferred, embodiment of the present invention.
Figure 3:
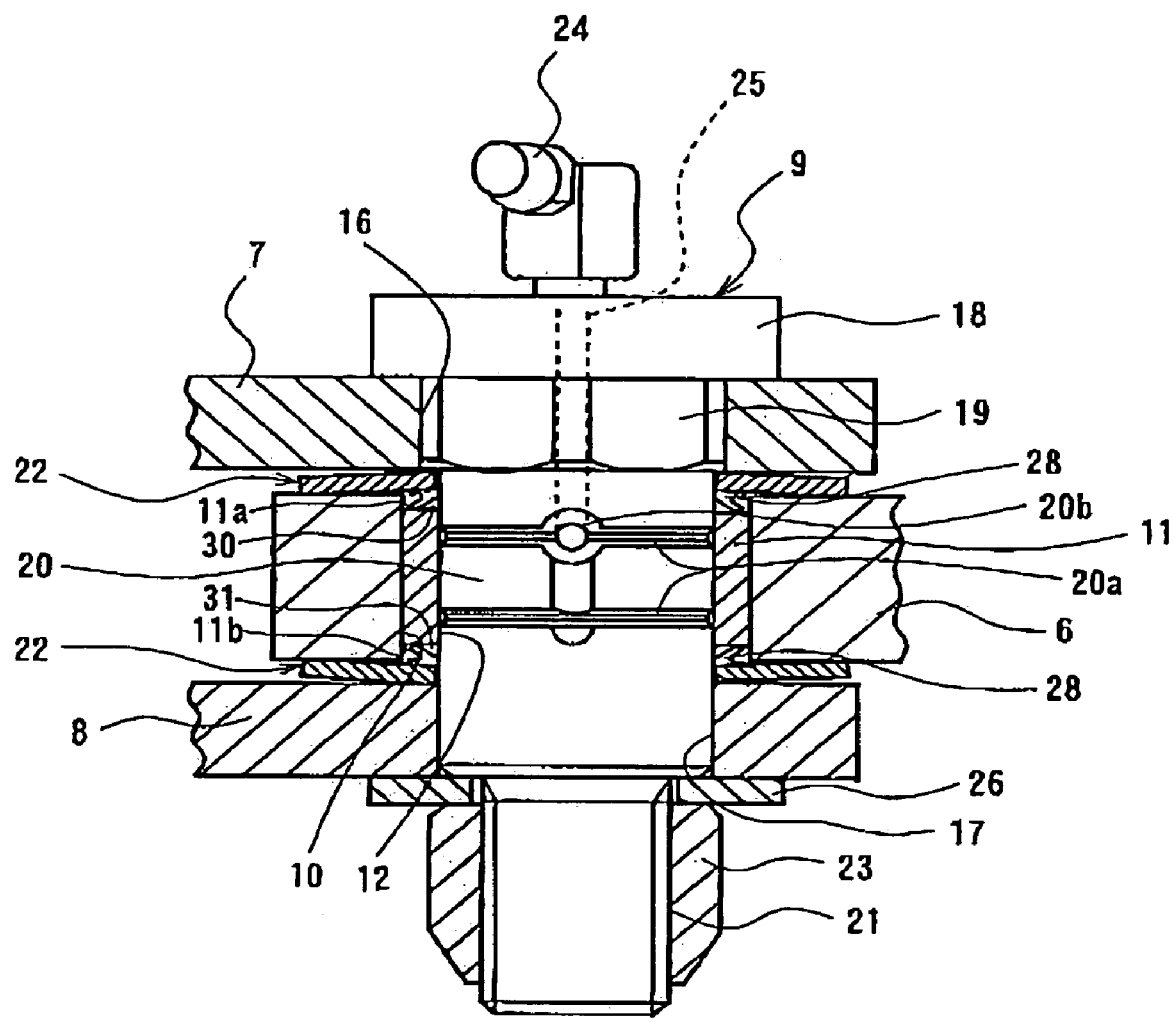
FIG. 3 is a partially enlarged cross sectional view showing connection between the tie rods and the cylinder arms according to the first preferred embodiment of the present invention.

Since the steering unit 1 has a symmetric structure with respect to the longitudinal center of the axle beam 2 as appreciated from FIG. 1, the following will describe one side for the left wheel of the steering unit 1 with reference to FIGS. 2 and 3. The cylinder arm 6 has formed therethrough a hole 10 in which a collar 11 that serves as a bearing member is fitted. The collar 11 is formed in a ring shape and made of a ferrous metal. The collar 11 has an insertion hole 12 through which the tie-rod pin 9 is inserted. Meanwhile, the knuckle arm 4 has formed through the proximal end thereof a hole 13 in which a collar 14 that serves as the bearing member is fitted. The collar 14 is also formed in a ring shape and made of a ferrous metal. The collar 14 has an insertion hole 15 through which the tie-rod pin 9 is inserted. The collars 11, 14 are formed such that the axial length thereof is shorter than that of the holes 10, 13 respectively through which the collars 11, 14 are fitted, such that, with the collars 11, 14 fitted through the holes 10, 13, respectively, a recess is formed at each of the top and bottom of each collar.

The upper and lower tie rods 7, 8 are plate-like members which are formed substantially the same in the outer peripheral shape thereof. The upper tie rod 7 is formed at the opposite ends thereof with hexagonal fitting holes 16 and the lower tie rod 8 is formed at the opposite ends thereof with through holes 17 The distance between the axial centers of the paired fitting holes 16 is substantially the same as that between the paired through holes 17. The upper and lower tie rods 7, 8 are disposed such that the paired fitting holes 16 and the paired through holes 17 are axially aligned, respectively.

The tie rod pin 9 includes a head 18, a fitting portion 19 that prevents rotation of the tie rod pin 9, a shank portion 20 and an externally threaded portion, 21 which are disposed in this order from the top in axially aligned relation to each other. The head 18 is provided in the top face thereof with a grease nipple 24 for applying lubricating grease. The shank portion 20 has formed in the outer peripheral surface thereof two circumferential grooves 20a. One of the grooves. 20a has a supply port 20b extending toward the axial center of the groove 20a. The supply port 20b is in communication with a communication passage 25 which is formed in the tie-rod pin 9 along the central axis thereof and opened to the top face of the tie-rod, pin 9. Therefore, grease is supplied from the grease nipple 24 to the groove 20a through the communication passage 25 and the supply port 20b.

The cylinder arm 6 and the knuckle arm are arranged such that the distal end of the former and the proximal end of the latter are connected and held by the ends of the upper and lower tie rods 7, 8, as shown in FIG. 2. Four seal washers 22, each of which serves as a seal, are interposed between the cylinder arm 6 and the tie rods 7, 8 and between the knuckle arm 4 and the tie rods 7, 8, respectively. In such arrangement, each tie-rod pin 9 is inserted through the aligned fitting hole 16, insertion hole 12 and through hole 17 located at one end of the tie rods 7, 8 and through the aligned fitting hole 16, insertion hole 15 and through hole 17 located at the other end of the tie rods 7, 8.

In the inserted state of each tie-rod pin 9, the fitting portion 19 is inserted in the hexagonal fitting hole 16 of the tie rod 7 to be fixedly positioned, the shank portion 20 is in contact with the inner peripheral surface of the insertion hole 12, 15 of the cylinder arm 6 or the knuckle arm 4 and inserted in the through hole 17 of the tie rod 8, and a nut 23 is screwed on the externally threaded portion 21 via a washer 26 such that the tie-rod pin 9 is retained in the connected state. Therefore the cylinder arm 6 and the knuckle arm 4 are pivotally connected to each other by the tie-rod pins 9 and the tie rods 7, 8 for pivotal movement.

Figure 4:
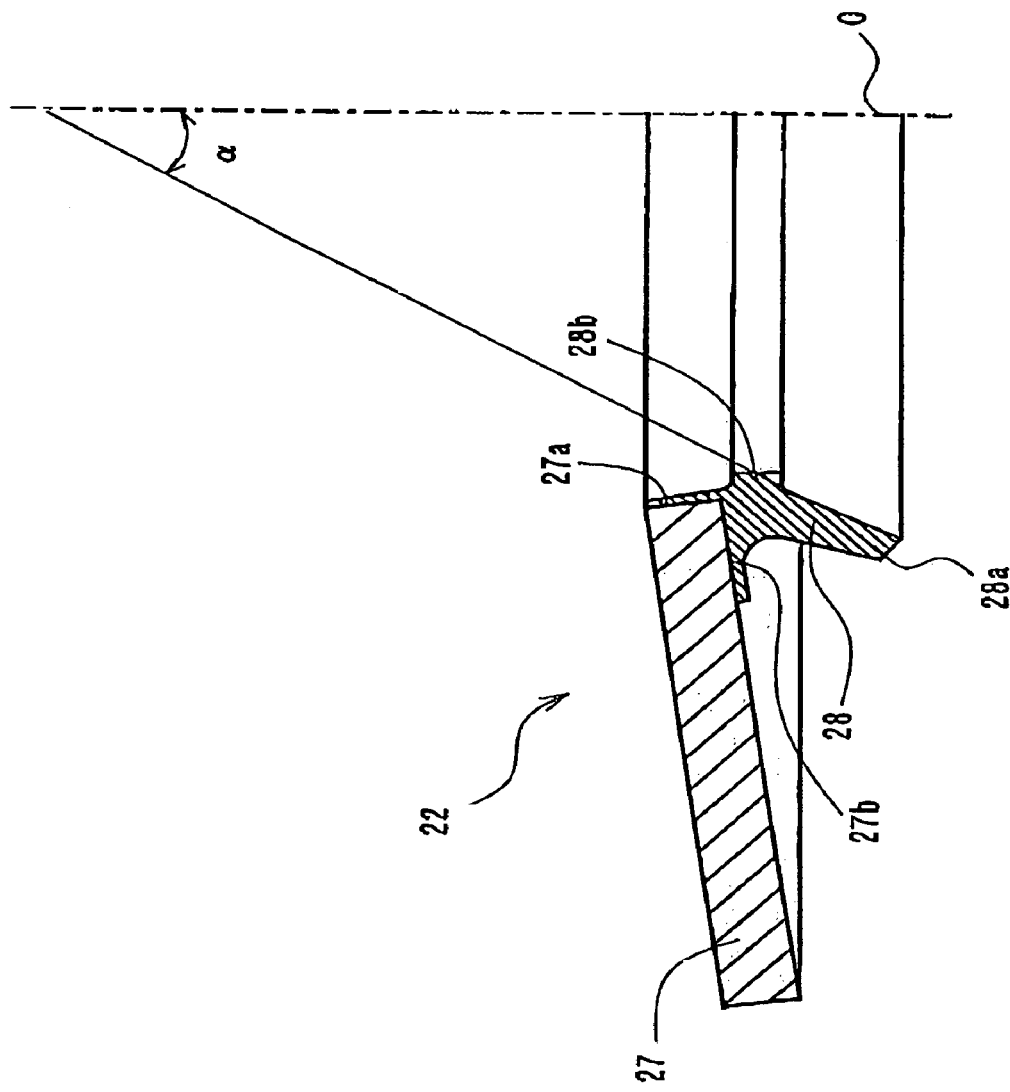
FIG. 4 is a detailed cross sectional view, showing the state of a seal washer, where it is free according to the first preferred embodiment of the present invention.

The seal washer 22 includes a washer 27 and a ring seal 28 which is made of a resilient material and fixed by baking to the inner peripheral surface 27a of the washer 27 and the inner peripheral portion 27b on the lower surface of the washer 27 as shown in FIG. 4. The washer 27 is provided by a metal disc spring and the seal 28 is made of any known resilient material such as nitrile rubber. The seal 28 of the seal washer 22 includes a first seal element 28a and a second seal element 28b. The first seal element 28a has a cross section of a protruding blade-like shape and is in contact with the surface of the cylinder arm 6 which corresponds to a member surface of the present invention. The second seal element 28b has a lip portion which is in contact with the surface of the tie-rod, pin 9 which also corresponds to the member surface of the present invention. The second seal element 28b is different from the first seal element 28a. The protruding blade-like portion of the first seal element 28a is formed with an outward slant with a predetermined angle of inclination α (0 degree<α<90 degrees) with respect to the central, axis O of the seal washer 22.

Figure 5:
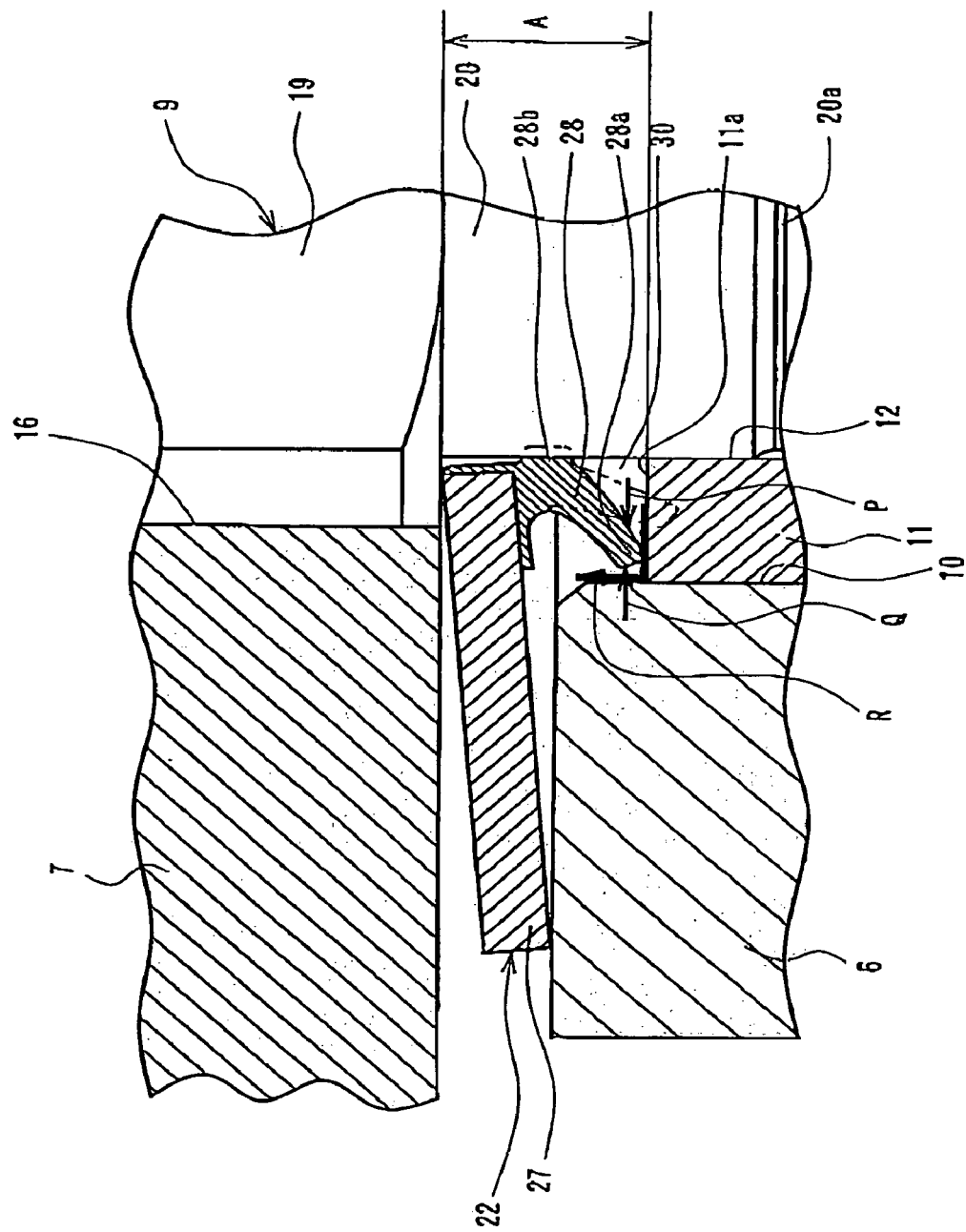
FIG. 5 is a detailed cross sectional view showing the state of the seal washer where it is combined according to the first preferred embodiment of the present invention.

The state of the seal washer 22 mounted in place shown in FIG. 5. The seal washer 22 is interposed between the tie rod 7 and the cylinder arm 6, and is mounted over the shank portion 20 of the tie-rod pin 9. The first seal element 28a is pressed in contact with an end face 11a of the collar 11 fitted in the cylinder arm 6 by a pressing force of a predetermined magnitude, and the second seal element 28b is in contact with the outer peripheral surface of the shank portion 20 of the tie-rod pin 9 thereby to seal the bearing. Chain double-dashed lines in FIG. 5 show the state of the seal 28 where it is free before being mounted. In the mounted state of the seal 28, the first seal element 28a is in contact with the end face 11a of the collar 11 with an increased angle of inclination α of the protruding blade-like portion thereof.

It is noted that the seal washer 22 which is interpose between the tie rod 8 and the cylinder arm 6 is disposed in upside down relation to the above-described seal washer 22. The first seal element 28a is in contact with the second seal element 28b is in contact with the outer peripheral surface of the shank portion 20 of the tie-rod pin 9. The same is true of the seal washer 22 which is interposed between the tie rods 7, 8 and the knuckle arm 4 and, therefore, the description thereof will be omitted.

The following will describe the operation for sealing the connection of the above described rear-axle tie rod Lubricating grease is supplied to the bearing from the grease nipple 24 on the top of the tie-rod pin 9 that serves as a shaft for connecting the cylinder arm 6 and the tie rod 7 (8). The grease reaches the grooves 20b in the circumferential surface of the shank portion 20 through the communication passage 25 formed in the tie-rod pin 9 and the supply port 20b and is then supplied to the sliding portion between the inner peripheral surface of the collar 11 that serves as the bearing and the outer peripheral surface of the shank portion 20, thus smoothening the relative rotation between the cylinder arm 6 and the tie-rod pin 9.

Meanwhile, the outer peripheral surface of the shank portion 20 is sealed by the second seal elements 28b of the upper and lower seal washers 22. The end faces 11a, 11b of the collar 11 are sealed by the first seal elements 28a of the upper and lower seal washers 22 which are in contact with the end faces 11a, 11b, respectively. That is, the outer peripheral surface of the shank portion 20, the end faces 11a, 11b of the collar 11, the second seal elements 28b which are in contact with the outer peripheral surface of the shank portion 20 and the first seal elements 28a which are in contact with the respective end faces 11a, 11b cooperate to form a sealed space 30.

Replenishment of new grease will be described with reference to FIG. 5. When new grease is supplied from the grease nipple 24, old grease which has been supplied to and used for lubricating the sliding surface is accumulated in the sealed space 30. The grease applying pressure causes the pressure in the sealed space 30 to be increased and the first seal element 28a is subjected to a force (indicated by arrow P) which acts to push the first seal, element 28a away from the sealed space 30. As a result, the first seal element 28a is moved in the direction which causes the first seal element 28a to be bent outwards making an opening between the first seal element 28a and the end face 11a thereby to allow the old grease to be discharged as indicated by arrow R. At the same time, the bearing of the collar 11 is filled with new grease.

On the Other hand, in the case of ingress of any foreign matter, the first seal element 28a receives external force indicated by arrow Q and the first seal element 28a is moved in the direction to be pressed against the end, faces 11a (11b). This causes the first seal element 28a to be strongly pressed in contact with the end face 11a (11b) thereby to prevent the ingress of foreign matter. The second seal element 28b, which is in contact with the outer peripheral surface of the shank portion 20, does not allow its lip portion to move even if the pressure in the sealed space 30 is increased, so that the grease will not leak out of the sealed space 30 to flow along the outer peripheral surface of the shank portion 20. In addition, even if the second seal element 28b receives an external force because of the ingress of any foreign matter, the lip portion of the second seal element 28b is not moved, which prevents the ingress of foreign matter along the outer peripheral surface of the shank portion 20.

The above bearing seal structure prevents the ingress of foreign matter while allowing the discharge of the grease. Since the old grease is appropriately discharged from the space new grease can be supplied into the space to constantly lubricate the sliding portion, which enhances the durability of the bearing. In addition, since the foreign matter such as moisture or dust is not permitted into the bearing, the shank portion 20 or the bearing members will not be affected by rust or abnormal wear.

Since the connections between the knuckle arm 4 and the ties rods 7, 8 have substantially the same operation as the above-described operation, the description thereof will be omitted.

The bearing sealing device according to the first preferred embodiment of the present invention has the following advantageous effects.

(1) Since the first seal element 28a of the seal washer 22 has a blade-like protruding portion which is formed with an outward slant and set in contact at the tip end thereof with the end face 11a (11b) of the collar 11 of the cylinder arm 6, the first seal element 28a is moved in the direction which causes the first seal element 28a to be bent outward by the grease pressure, thereby allowing the discharge of the grease. When an external pressure is applied to the first seal element 28a, the first seal element 28a is moved in the direction which causes the first seal element 28a to be pressed against the end faces 11a (11b). Thus, the first seal element 28a is then kept pressed against the end face 11a (11b) thereby to prevent the ingress of foreign matter (2) Since the second seal element 28b of the seal washer 22 is kept in sealing contact with the outer peripheral surface of the shank portion 20 of the tie-rod pin 9 that serves as the connecting shaft, the second seal element 28b prevents the lubricant retained by the bearing from leaking outward along the outer peripheral surface of the shank portion 20. In addition the second seal element 28b prevents the ingress of foreign matter such as moisture into the sealed space 30 along the outer peripheral surface of the shank portion 20. Therefore, no additional seal for the above sealing purposes will be needed.

(3) Since the seal washer 22 is constructed such that the washer 27 and the seal 28 are combined, failure to mount the seal in assembling of the bearing sealing device is avoided. In addition, inappropriate placement between the washer and the seal in assembling the bearing sealing device is prevented.

(4) Since the seal washer 22 is so constructed that the washer 27 and the seal 28 are combined and hence easy to assemble, the total cost for the bearing sealing device is reduced and, therefore the seal washer 22 is economical. The assembling process may dispense with some steps of operation and the number of parts for the device may be reduced and, therefore, the management of part numbers and quality inspection or verification may be facilitated.

(5) Since the first seal element 28a is made to have a long blade-like portion which can be bent to a large extent, variation in height dimension A of housing is absorbed thereby allowing the tolerance of the height dimension A to be increased. It is noted that the height dimension A of the housing corresponds to the distance between the lower surface of the tie rod 7 and the end face 11a of the collar 11 as shown in FIG. 5.

(6) The above effects (1) to (5) are achievable by the seal washer 22 which is interposed between the knuckle arm 4 and the tie rods 7, 8.

Figure 6:
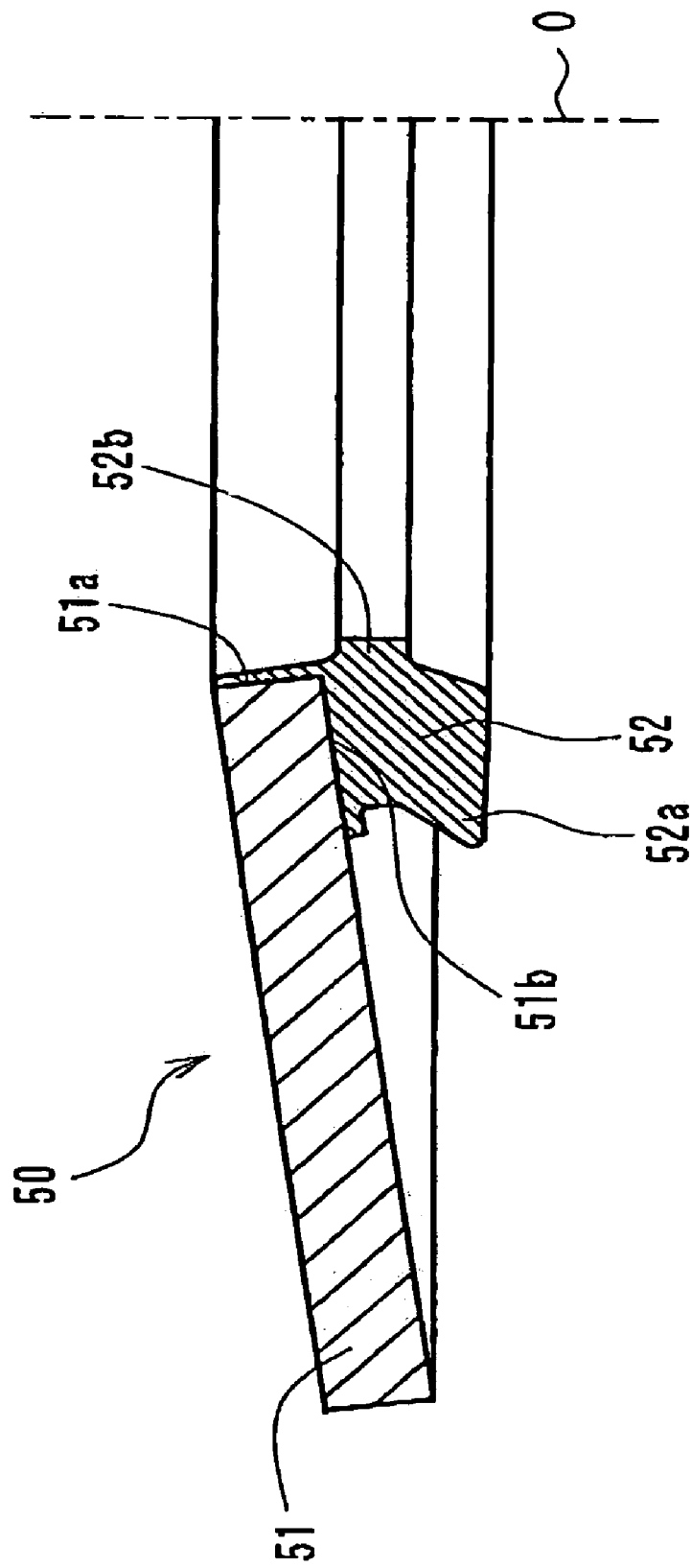
FIG. 6 is a detailed cross sectional view showing the state of a seal washer where it is free according to a second preferred embodiment of the present invention.
Figure 7:
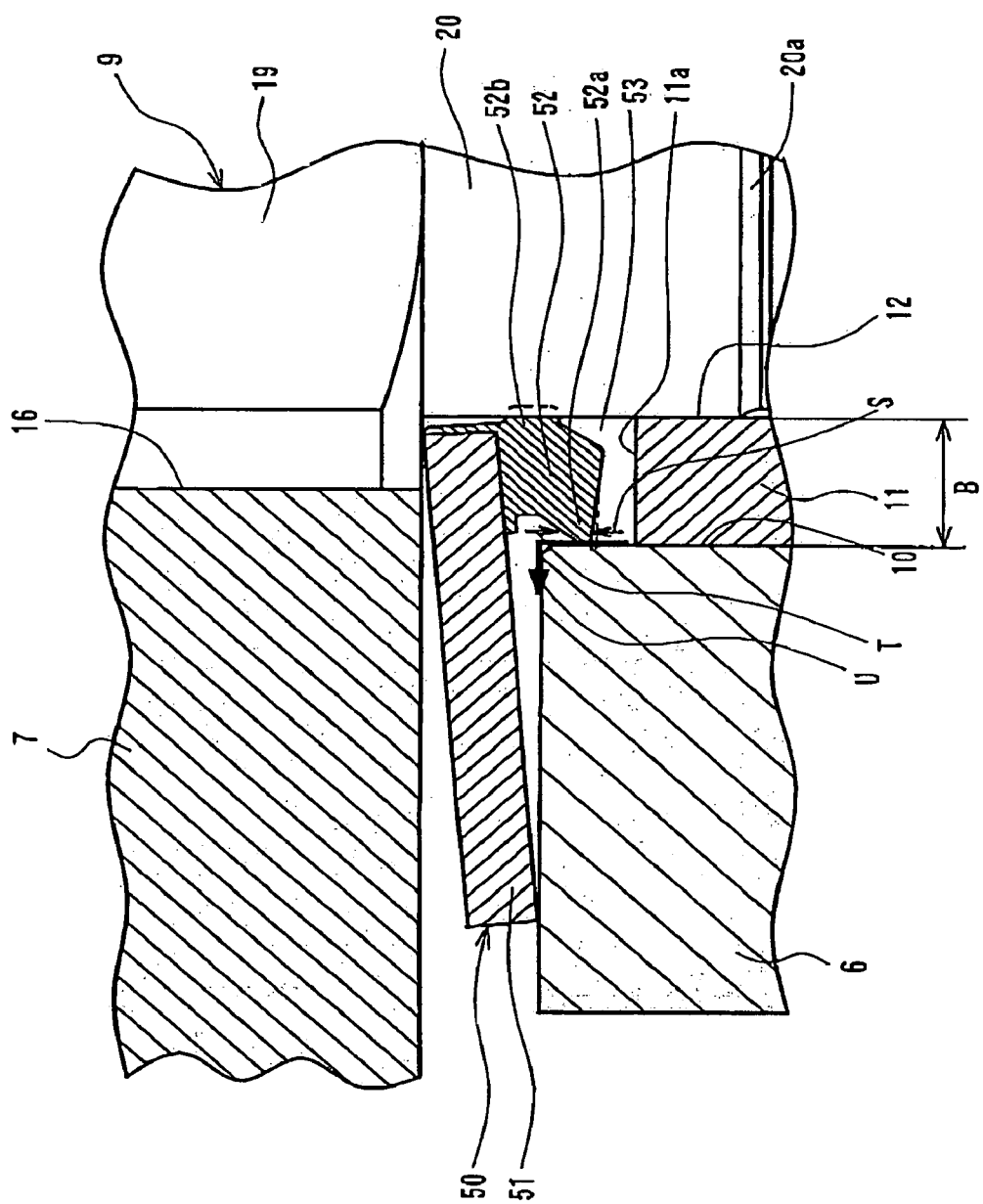
FIG. 7 is a detailed cross sectional view showing the state of the seal washer where it is combined according to the second preferred embodiment of the present invention.

The following will describe a bearing sealing device according to a second preferred embodiment of the present invention with reference to FIGS. 6 and 7. This second embodiment differs from the first embodiment in the shape of the first seal element of the seal washer. As a matter of explanatory convenience, the same reference numerals of the first embodiment are partially used for the second embodiment. The explanation for the common structure will be omitted and the modified structure only will be explained.

Referring to FIG. 6, the seal washer 50 which serves as a seal includes a washer 51 and a ring seal 52 which is made of a resilient material and fixed by baking to inner peripheral surface 51a of the insertion hole of the washer 51 and to inner peripheral portion 51b of the lower surface of the washer 51. The washer 51 is provided by a metal disc spring and the seal 52 is made of any known resilient material such as nitrile rubber. The seal 52 of the seal washer 50 includes a first seal element 52a and a second seal element 52b. The first seal element 52a has a cross section of a protruding blade-like shape. The second seal element 52b has a lip portion which is contactable with the outer peripheral surface of the shank portion 20 of the tie-rod pin 9, as shown in FIG. 7. The blade-like protruding portion of the first seal element 52a has a lip shape protruding outward with respect to the central axis O of the seal washer 50.

The state of the seal washer 50 mounted in place is shown in FIG. 7. The seal washer 50 is interposed between the tie rod 7 and the cylinder arm 6, and is mounted over the shank portion 20 of the tie-rod pin 9. The first seal element 52a is pressed in contact with the inner peripheral surface of the through hole 10 of the cylinder arm 6 on which the collar 11 is mounted by a pressing force of a predetermined magnitude, and the second seal element 52b is in contact with the outer peripheral surface of the shank portion 20 of the tie-rod pin 9 thereby to seal the bearing. Chain double-dashed lines in FIG. 7 show the state of the seal 52 where it is free before being mounted.

It is noted that the seal washer 50 which is interposed between the tie rod 8 and the cylinder arm 6 is disposed in upside down relation (not shown) to the above-described seal washer 50. The first seal element 52a is in contact with the inner peripheral surface of the through hole 10 of the, cylinder arm 6 on which the collar 11 is mounted, and the second seal element 52b is in contact with the outer peripheral surface of the shank portion 20 of the tie-rod pin 9. The same is true of the seal washer 50 which is interposed between the tie rods 7, 8 and the knuckle arm 4 and, therefore, the description thereof will be omitted.

The following will describe the operation for sealing the connection of the above-described rear-axle tie rod. Lubricating grease is supplied to the bearing from the grease nipple 24 on the top of the tie-rod pin 9 that serves as a shaft for connecting the cylinder arm 6 and the tie rod 7 (8). The grease reaches the grooves 20b in the circumferential surface of the shank portion 20 through the communication passage 25 formed in the tie-rod pin 9 and the supply port 20b and is then supplied to the sliding portion between the inner peripheral surface of the collar 11 that serves as the bearing and the outer peripheral surface of the shank portion 20, thus smoothening the relative rotation between the cylinder arm 6 and the tie-rod pin 9.

Meanwhile, the outer peripheral surface of the shank portion 20 is sealed by the second seal elements 52b of the upper and lower seal washers 50. The end face of the cylinder arm 6 is sealed by the first seal elements 52a of the seal washers 50 which are in contact with the respective upper and lower sides of the inner peripheral surface of the through hole 10 of the cylinder arm 6 on which the collar 11 is mounted. That is, the outer peripheral surface of the shank portion 20, the inner peripheral surface of the, through hole 10 of the cylinder arm 6, the second seal elements 52b which are in contact with the outer peripherial surface of the shank portion 20, and the first seal elements 52a which are in contact with the inner peripheral surface of the through hole 10 of the cylinder arm 6 cooperate to form a sealed space 53.

Replenishment of new grease will be described with reference to FIG. 7. When new grease is supplied from the grease nipple 24, old grease which has been supplied to and used for lubricating the sliding surface is accumulated in the sealed space 53. The grease applying pressure causes the pressure in the sealed space 53 to be increased and the first seal element 52a is subjected to a force (indicated by arrow S) which acts to push the first seal element 52a away from the sealed space 53. As a result, the first seal, element 52a is moved in the direction which causes the first seal element 52a to be bent outward, making an opening between the first seal element 52a and the inner peripheral surface of the through hole 10 thereby to allow the old grease to be discharged as indicated by arrow U. At the same time, the bearing of the collar 11 is filled with new grease.

On the other hand, in the case of ingress of any foreign matter, the first seal element 52a receives external force indicated by arrow T and the first seal element 52a is moved in the direction which causes the first seal element 52a to be pressed against the inner peripheral surface of the through hole 10 of the cylinder arm 6. This causes the first seal element 52a to be strongly pressed in contact with the inner peripheral surface of the through hole 10 thereby to prevent the ingress of foreign matter into the sealed space 53. The second seal element 52b, which is in contact with the outer peripheral surface of the shank portion 20, does not allow its lip portion to move even if the pressure in the sealed space 53 is increased, so that the grease will not leak out of the sealed space 53 to flow along the outer peripheral surface of the shank portion 20. In addition even if the second seal element 52b receives an external force because of the ingress of any foreign matter, the lip portion of the second seal element 52b is not moved, which prevents the ingress of foreign matter along, the outer peripheral surface of the shank portion 20.

The above bearing seal structure prevents the ingress of foreign matter into the sealed space 53 while allowing the discharge of the grease therefrom. Since the old grease is appropriately discharged from the sealed space 53, new grease can be supplied into the sealed space 53 to constantly lubricate the sliding portion, which enhances the durability of the bearing. In addition, since the foreign matter such as moisture or dust is not permitted into the bearing from without, the shank portion 20 or the bearing members will not be affected by rust or abnormal wear. Since the connections between the knuckle arm 4 and the tie rods 7, 8 have substantially the same operation as the above-described operation, the description thereof will be omitted.

The bearing sealing device according to the second preferred embodiment of the present invention has the following advantageous effects (7) to (9) in addition to the aforementioned (2) to (4).

(7) Since the first seal element 52a of the seal washer 50 has a blade-like protruding portion which is in contact with the inner peripheral surface of the through hole 10 of the cylinder arm 6 in which the collar 11 is fitted, the first seal element 52a is moved in the direction which causes the first seal element 52a to be bent outward by the grease pressure in the sealed space 30, thereby making an opening between the first seal element 52a and the inner peripheral surface of the through hole 10 through which the grease is allowed to be discharged. When the external pressure is applied to the first seal element 52a, the first seal element 52a is moved in the direction which causes the first seal element 52a to be pressed against the inner peripheral surface of the through hole 10. Thus, the first seal element 52a is then kept pressed against the inner peripheral surface of the through hole 10 thereby to prevent the ingress of foreign matter.

(8) Since the sealing is accomplished by the first seal element 52a which is in contact with the inner peripheral surface of the through hole 10 in which the collar 11 is fitted, variation in transverse dimension B for seal housing is relatively small thereby to stabilize the sealing. It is noted that the transverse dimension B of the housing corresponds to the distance between the inner peripheral surface of the through hole 10 and the outer peripheral surface of the shank portion 20 as shown in FIG. 7.

(9) The above effects (7) and (8), as well as the aforementioned (2) to (4) are achievable by the seal washer 50 which is interposed between the knuckle arm 4 and the tie rods 7, 8.

The present invention is not limited to the, above-described embodiments but may be variously modified within the scope of the purpose of the invention, as exemplified below.

Figure 8:
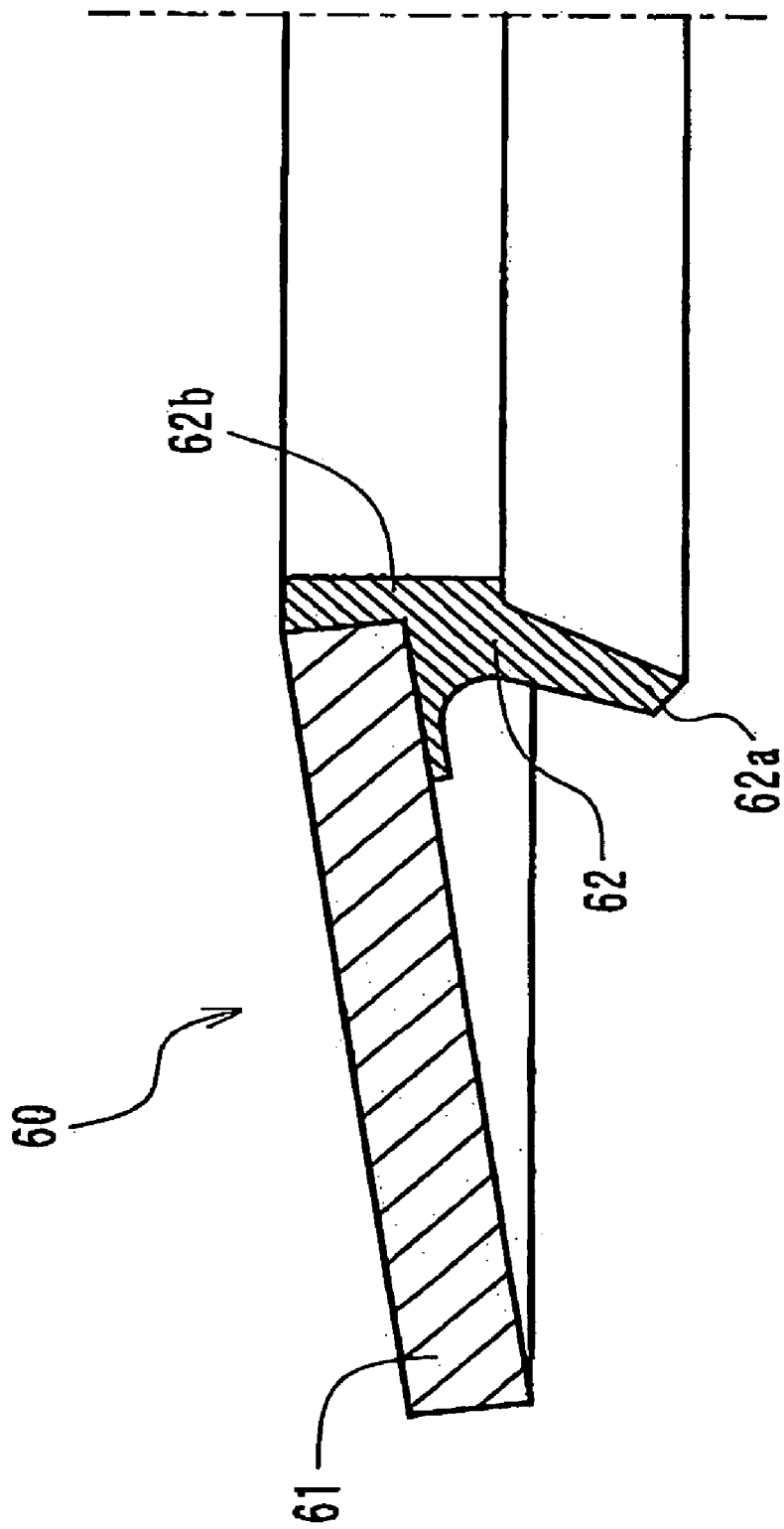
FIG. 8 is a detailed cross sectional view showing the state of a seal washer where it is free according to another embodiment of the present invention.
Figure 9:
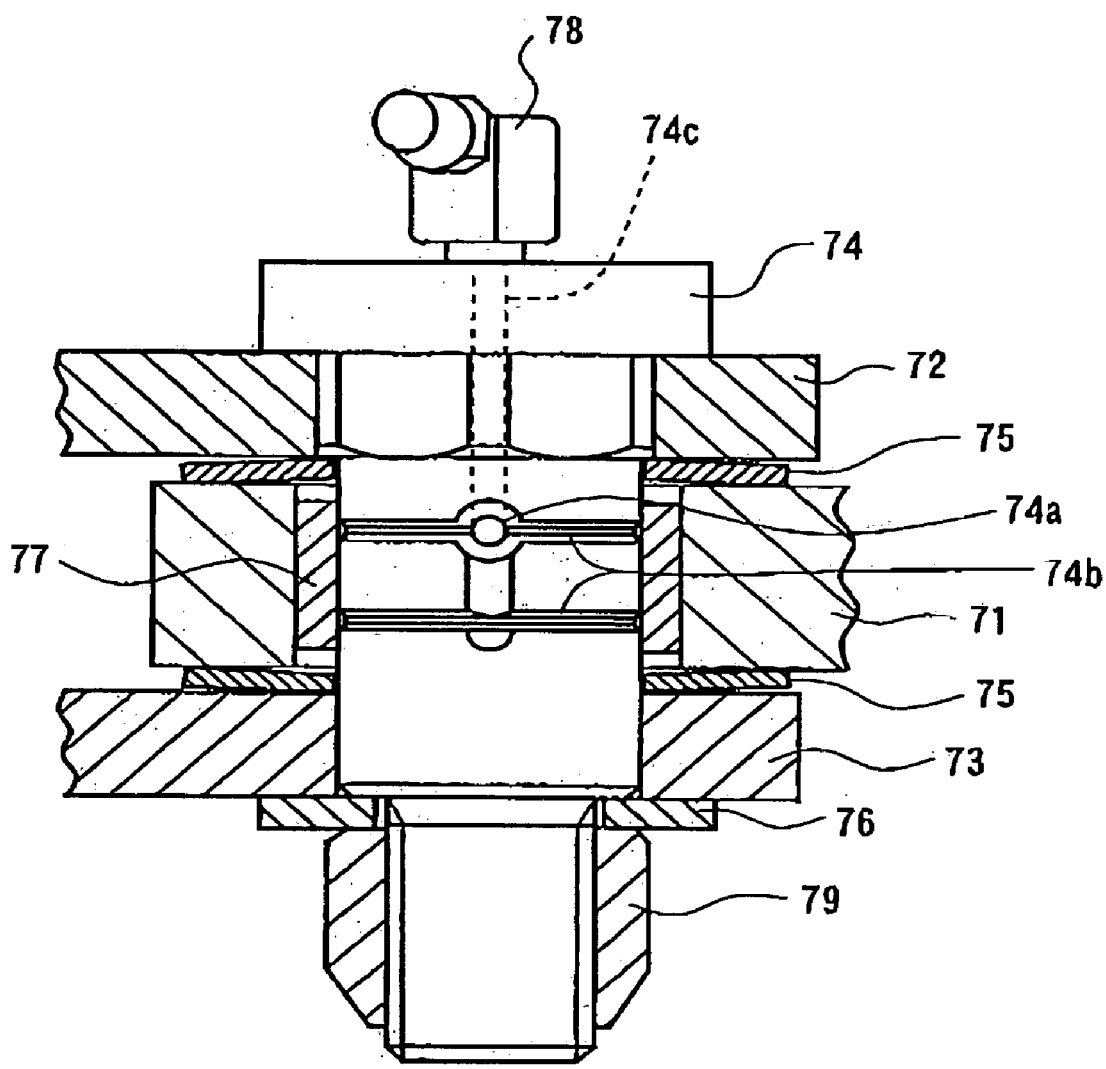
FIG. 9 is an enlarged cross sectional view showing a prior art connection between tie rods and a cylinder arm; and, FIG. 10 is a partially enlarged cross sectional view showing the prior art a connection between the tie rod and the cylinder arm.
Figure 10:
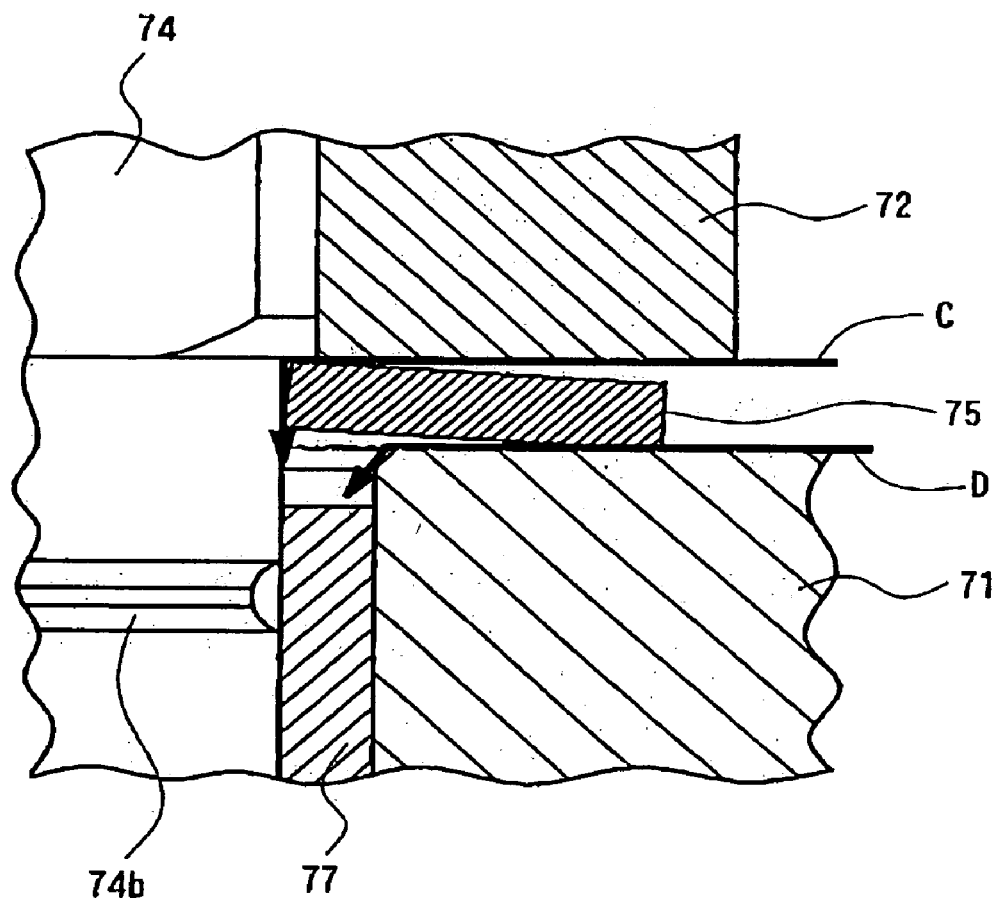

In modified embodiments to the first and second embodiments, the second seal element 62b which is in contact with the outer peripheral surface of the shank portion 20 of the tie-rod pin 9 has a lengthened and straight-shaped lip portion, as shown in FIG. 8, so that the contact length or area between the lip portion and the outer peripheral surface of the shank portion 20 is enlarged.

In the first and second embodiments, the ring seal is so arranged that its first seal element is in contact with the end face of the bearing member or the inner wall surface of the fitting hole on which the bearing member is mounted and the first seal element is bendable outward only by the grease pressure in the sealed space, and that the second seal element is in contact with the outer peripheral surface of the shank portion of the tie-rod pin and it is not bendable by pressure. In modified embodiments to the first and second embodiments, however, the first seal element is formed so as not to be bent by any pressure, and the second seal element is formed so as to be bent outward only by the pressure in the sealed space. In this case, grease can be discharged to the outside flowing along the outer peripheral surface of the shank portion which is in contact with the second seal element. Alternatively, both of the first and second seal elements may be formed so as to be bent outward by the internal pressure only. In this case, grease can be discharged to the outside flowing along both of the inner peripheral surface of the through hole 10 of the cylinder arm 6 which is in contact with the first seal element and the outer peripheral surface of the shank portion which is in contact with the second seal element.

Although in the first and second embodiments a resilient disc spring is used for the washer of the seal washer, a ring-shaped flat washer having no resilient force may be used. Alternatively, when resilient force is needed for the washer, a resilient member such as spring washer may be used with the flat washer.

Although In the first and second embodiments the collar is used for the bearing member and grease is supplied to the sliding portion between the collar and the shaft, a sliding bearing other than the collar may be used for the bearing member. Alternatively, a rolling bearing such as ball bearing or roller bearing may be used. Grease supply is not necessarily needed when oilless bearing or sealed type bearing is used.

Although in the first and second embodiments a bearing sealing device is used for the steering unit mounted on a forklift truck, the bearing sealing device is not limited to the use for an industrial vehicle such as forklift truck. The bearing sealing device of the present invention is applicable to any product having the bearing of the above structure such as vehicles other than forklift truck or machine tools.

Therefore, the present examples and embodiments are to be considered as illustrative and not restrictive and the invention is not to be limited to the details given herein but may be modified within the scope and equivalence of the appended claims.

What is claimed is:

1. A bearing sealing device for sealing a bearing member which is interposed between a first member and a second member and allows relative rotation between the first member and the second member, wherein the first member is located radially outward of the bearing member and the second member is located radially inward of the bearing member, comprising:
   a seal washer comprising:
      a metallic washer located adjacent to the first member and the second member; and
      a resilient seal fixed to an inner periphery of the washer and interposed between the first member and the second member for sealing the bearing member to form a sealed space between the seal and the bearing member, the seal having a first seal element which is normally in contact with one of member surfaces of the first member and the bearing member, wherein the first seal element is bendable outward only by increased pressure in the space, wherein an outer periphery of the washer is in contact with an end face of the first member, which helps to prevent foreign matter from entering into the space.

2. The bearing sealing device according to claim 1, wherein the member surface which the first seal element of the seal is in contact with is an end face of the bearing member which is mounted on one of the first member and the second member.

3. The bearing sealing device according to claim 1, wherein the member surface which the first seal element of the seal is in contact with is an inner wall surface of one fitting hole of the first member.

4. The bearing sealing device according to claim 1, wherein the first seal element of the seal has a blade-like protruding portion which is in contact with the bearing member which is mounted on one of the first member and the second member, wherein the blade-like protruding portion is formed with an outward slant with respect to a central axis of the seal washer.

5. The bearing sealing device according to claim 1, wherein the seal washer includes a second seal element that is different from the first seal element, the second seal element being in contact with a member surface of the second member.

6. A steering unit in a vehicle, comprising:
a pair of tie rods;
a cylinder arm interposed between the paired tie rods;
a tie rod pin for connecting the cylinder arm to the tie rods;
a bearing member mounted in a hole formed in the cylinder arm;
a pair of seal washers one of which is located between the bearing member and one of the tie rods, the other seal washer being located between the bearing member and the other tie rod, each seal washer comprising:
 a metallic washer interposed between the cylinder arm and the tie rod; and
 a resilient seal fixed to an inner periphery of the washer and interposed between the cylinder arm and the tie rod pin for sealing the bearing member to form a sealed space between the seal and the bearing member, the seal having a first seal element which is normally in contact with one of member surfaces of the cylinder arm and the bearing member, wherein the first seal element is bendable outward only by increased pressure in the space, wherein an outer periphery of the washer is in contact with an end face of the cylinder arm, which helps to prevent foreign matter from entering into the space.

7. A steering unit in a vehicle, comprising:
a pair of tie rods;
a knuckle arm interposed between the paired tie rods;
a tie rod pin for connecting the knuckle arm to the tie rods;
a bearing member mounted in a hole formed in the knuckle arm;
a pair of seal washers one of which is located between the bearing member and one of the tie rods, the other seal washer being located between the bearing member and the other tie rod, each seal washer comprising:
 a metallic washer interposed between the knuckle arm and the tie rod; and
 a resilient seal fixed to an inner periphery of the washer and interposed between the knuckle arm and the tie rod pin for sealing the bearing member to form a sealed space between the seal and the bearing member, the seal having a first seal element which is normally in contact with one of member surfaces of the knuckle arm and the bearing member, wherein the first seal element is bendable outward only by increased pressure in the space, wherein an outer periphery of the washer is in contact with an end face of the knuckle arm, which helps to prevent foreign matter from entering into the space.

* * * * *

UNITED STATES PATENT AND TRADEMARK OFFICE
CERTIFICATE OF CORRECTION

| | |
|---|---|
| PATENT NO. | : 7,458,725 B2 |
| APPLICATION NO. | : 11/297026 |
| DATED | : December 2, 2008 |
| INVENTOR(S) | : Kenichi Katae |

It is certified that error appears in the above-identified patent and that said Letters Patent is hereby corrected as shown below:

Column 1, line 7, please delete "sealing, a bearing" and insert therefore -- sealing a bearing --;

Column 1, line 42, please delete "With the flat surface of a bushing inserted in bolt holes" and insert therefore -- The flat surface of a bushing is inserted in bolt holes --;

Column 1, line 59, please delete "it Is difficult to discharge" and insert therefore -- it is difficult to discharge --;

Column 2, lines 44 and 48, please delete "a partially enlarged cross sectional view" and insert therefore -- a partially enlarged cross-sectional view --;

Column 2, line 45, please delete "connections between, the rods," and insert therefore -- connnections between the rods, --;

Column 2, line 46, please delete "first preferred, embodiment" and insert therefore -- first preferred embodiment --;

Column 2, line 51, please delete "a detailed cross sectional view," and insert therefore -- a detailed cross-sectional view --;

Column 2, line 52, please delete "of a seal washer, where it is free" and insert therefore -- of a seal washer where it is free --;

Column 2, lines 54, 57 and 60, please delete "a detailed cross sectional view" and insert therefore -- a detailed cross-sectional view --;

Column 2, line 66, please delete "an enlarged cross sectional view" and insert therefore -- an enlarged cross-sectional view --;

Column 3, line 1, please delete "a partially enlarged cross sectional view" and insert therefore -- a partially enlarged cross-sectional view --;

Column 3, line 11, please delete "FIG 1 shows a steering unit 1" and insert therefore -- FIG. 1 shows a steering unit 1 --;

UNITED STATES PATENT AND TRADEMARK OFFICE
CERTIFICATE OF CORRECTION

PATENT NO. : 7,458,725 B2
APPLICATION NO. : 11/297026
DATED : December 2, 2008
INVENTOR(S) : Kenichi Katae It is certified that error appears in the above-identified patent and that said Letters Patent is hereby corrected as shown below:

Column 3, line 19, please delete "rear axle beam 2 and right and left cylinder arms 6 each" and insert therefore -- rear axle beam 2, and right and left cylinder arms 6, each --;

Column 3, lines 21-22, please delete "opposite ends of the hydraulic cylinder 51 respectively." and insert therefore -- opposite ends of the hydraulic cylinder 5, respectively. --;

Column 3, line 28, please delete "while oil in the others chamber" and insert therefore -- while oil in the other chamber --;

Column 3, lines 39, 40, 43 and 50, please delete "tie rods 7, 8" and insert therefore -- tie-rods 7, 8--;

Column 3, line 48, please delete "which the steering wheel is turned By such movement" and insert therefore -- which the steering wheel is turned. By such movement --;

Column 3, lines 56-57, please delete "the wheel 3 are steered leftward." and insert therefore -- the wheels 3 are steered leftward. --;

Column 4, lines 10, 17, 38, 40, 41, 44, 46 and 56, please delete "tie rods 7, 8" and insert therefore -- tie-rods 7, 8 --;

Column 4, lines 12 and 48, please delete "tie rod 7" and insert therefore -- tie-rod 7 --;

Column 4, line 14, please delete "tie rod 8" and insert therefore -- tie-rod 8 --;

Column 4, line 15, please delete "holes 17 The distance" and insert therefore -- holes 17. The distance --;

Column 4, line 20, please delete "The tie rod pin 9" and insert therefore -- The tie-rod pin 9 --;

Column 4, line 22, please delete "externally threaded portion, 21" and insert therefore -- externally threaded portion 21 --;

UNITED STATES PATENT AND TRADEMARK OFFICE
CERTIFICATE OF CORRECTION

PATENT NO. : 7,458,725 B2
APPLICATION NO. : 11/297026
DATED : December 2, 2008
INVENTOR(S) : Kenichi Katae It is certified that error appears in the above-identified patent and that said Letters Patent is hereby corrected as shown below:

Column 4, line 27, please delete "One of the grooves. 20a" and insert therefore -- One of the grooves 20a --;

Column 4, line 32, please delete "the tie-rod pin, 9." and insert therefore -- the tie-rod pin 9. --;

Column 4, line 35, please delete "the knuckle arm" and insert therefore -- the knuckle arm 4 --;

Column 4, line 52, please delete "through hole 17 of the tie rod 8," and insert therefore -- through hole 17 of the tie-rod 8, --;

Column 4, line 66, please delete "The first seal element 28a has a cross section" and insert therefore -- The first seal element 28a has a cross-section --;

Column 5, lines 3-4, please delete "the surface of the tie-rod, pin 9" and insert therefore -- the surface of the tie-rod pin 9 --;

Column 5, line 9, please delete "the central, axis O of the seal washer" and insert therefore -- the central axis O of the seal washer --;

Column 5, line 11, please delete "seal washer 22 mounted in place shown" and insert therefore -- seal washer 22 mounted in place is shown --;

Column 5, line 12, please delete "the tie rod 7" and insert therefore -- the tie-rod 7 --;

Column 5, lines 28-29, please delete "The first seal element 28a is in contact with the second seal element 28b" and insert therefore -- The first seal element 28a is in contact with the end face 11a of the collar 11 which is fitted in the cylinder arm 6, and the second seal element 28b --;

Column 5 lines 31-32, please delete "tie rods 7, 8" and insert therefore -- tie-rods 7, 8 --;

Column 5, lines 35-36, please delete "the above described rear-axle tie rod Lubricating grease" and insert therefore -- the above-described, rear-axle tie-rod. Lubricating grease --;

UNITED STATES PATENT AND TRADEMARK OFFICE
CERTIFICATE OF CORRECTION

PATENT NO. : 7,458,725 B2
APPLICATION NO. : 11/297026
DATED : December 2, 2008
INVENTOR(S) : Kenichi Katae It is certified that error appears in the above-identified patent and that said Letters Patent is hereby corrected as shown below:

Column 5, line 38, please delete "and the tie rod 7 (8)." and insert therefore -- and the tie-rod 7 (8). --;

Column 5, line 66, please delete "to push the first seal, element 28a" and insert therefore -- to push the first seal element 28a --;

Column 6, line 7, please delete "On the Other hand," and insert therefore -- On the other hand, --;

Column 6, line 10, please delete "direction to be pressed against the end, faces 11a (11b)." and insert therefore -- direction to be pressed against the end faces 11a (11b). --;

Column 6, line 27, please delete "space new grease can be supplied" and insert therefore -- space, new grease can be supplied --;

Column 6, line 34, please delete "tie rods 7, 8" and insert therefore -- tie-rods 7, 8 --;

Column 6, line 53, please delete "to prevent the ingress of foreign matter" and insert therefore -- to prevent the ingress of foreign matter. --;

Column 7, line 14, please delete "height dimension A of housing" and insert therefore -- height dimension A of the housing --;

Column 7, line 22, please delete "tie rods 7, 8." and insert therefore -- tie-rods 7, 8. --;

Column 7, line 41, please delete "element 52a has a cross section" and insert therefore -- element 52a has a cross-section --;

Column 7, lines 49-50, please delete "tie rod 7" and insert therefore -- tie-rod 7 --;

Column 7, line 61, please delete "the tie rod 8" and insert therefore -- the tie-rod 8 --;

Column 7, line 64, please delete "through hole 10 of the, cylinder" and insert therefore -- through hole 10 of the cylinder --;

UNITED STATES PATENT AND TRADEMARK OFFICE
CERTIFICATE OF CORRECTION

PATENT NO. : 7,458,725 B2
APPLICATION NO. : 11/297026
DATED : December 2, 2008
INVENTOR(S) : Kenichi Katae It is certified that error appears in the above-identified patent and that said Letters Patent is hereby corrected as shown below:

Column 8, lines 1-2, please delete "the tie rods 7, 8" and insert therefore -- the tie-rods 7, 8 --;

Column 8, line 5, please delete "above-described rear-axle tie rod." and insert therefore -- above-described, rear-axle tie-rod. --;

Column 8, line 8, please delete "and the tie rod 7 (8)." and insert therefore -- and the tie-rod 7 (8). --;

Column 8, line 25, please delete "peripheral surface of the, through hole 10" and insert therefore -- peripheral surface of the through hole 10 --;

Column 8, line 39, please delete "As a result, the first seal, element 52a" and insert therefore -- As a result, the first seal element 52a --;

Column 8, line 64, please delete "along, the outer peripheral surface" and insert therefore -- along the outer peripheral surface --;

Column 9, lines 8 and 42-43, please delete "and the tie rods 7, 8" and insert therefore -- and the tie-rods 7, 8 --;

Column 9, lines 44-45, please delete "The present invention is not limited to the, above-described embodiments" and insert therefore -- The present invention is not limited to the above described embodiments --;

Column 10, line 13, please delete "resilient member such as spring washer" and insert therefore -- resilient member such as a spring washer --;

Column 10, line 15, please delete "Although In the first and second embodiments" and insert therefore -- Although in the first and second embodiments --;

Column 10, line 19, please delete "such as ball bearing" and insert therefore -- such as a ball bearing --;

UNITED STATES PATENT AND TRADEMARK OFFICE
CERTIFICATE OF CORRECTION

PATENT NO.         : 7,458,725 B2
APPLICATION NO.    : 11/297026
DATED              : December 2, 2008
INVENTOR(S)        : Kenichi Katae It is certified that error appears in the above-identified patent and that said Letters Patent is hereby corrected as shown below:

Column 10, line 21, please delete "when oilless bearing" and insert therefore -- when an oil-less bearing --;

Column 10, line 25, please delete "such as forklift truck." and insert therefore -- such as a forklift truck. --; and Column 10, line 28, please delete "vehicles other than forklift truck" and insert therefore -- vehicles other than a forklift truck --.

Signed and Sealed this

First Day of December, 2009

David J. Kappos
*Director of the United States Patent and Trademark Office*